(No Model.)

H. H. EDGERTON.
OBTAINING HYDROGEN FROM WATER GAS.

No. 366,081. Patented July 5, 1887.

Attest:
Geo. T. Smallwood,
J. Henry Kaiser.

Inventor,
Henry H. Edgerton
by A. Pollok
his attorney

United States Patent Office.

HENRY H. EDGERTON, OF DANBURY, CONNECTICUT.

OBTAINING HYDROGEN FROM WATER-GAS.

SPECIFICATION forming part of Letters Patent No. 366,081, dated July 5, 1887.

Application filed July 2, 1883. Serial No. 99,830. (No model.)

*To all whom it may concern:*

Be it known that I, HENRY H. EDGERTON, a resident of Danbury, in the county of Fairfield and State of Connecticut, have invented a new and useful Improvement in Methods of and Apparatus for Separating Gases and in the Manufacture of Hydrogen for Various Purposes, which improvement is fully set forth in the following specification.

This invention relates to the separation of a lighter from a heavier gas or gases in admixture therewith, and is particularly designed for the separation of hydrogen from the composition of hydrogen, carbonic oxide, and carbonic acid, resulting from the decomposition of steam by incandescent carbon, and known as "water-gas," although it is applicable to the separation of other gases.

The invention is based upon the principle or discovery that when a mixture of gases is subject to pressure in a vessel having the whole or part of one or more sides formed of porous material—such as the unglazed biscuit-ware of the porous cups used in galvanic batteries—the lighter gases pass through the same much more rapidly than the heavier ones.

It consists, first, in the method of separating gases in admixture by forcing the mixture into such a chamber and removing the lighter gases, which pass through the porous material before the heavier gases pass through; secondly, in maintaining a flow under pressure of the mixture through the said chamber, so that the operation is continuous, the heavier gases being removed before they can pass through the porous material; and, thirdly, in the apparatus for carrying the process into effect.

The invention also consists in a method of obtaining hydrogen gas by "analyzing" (as the above process may be termed) water-gas.

Figure 1:
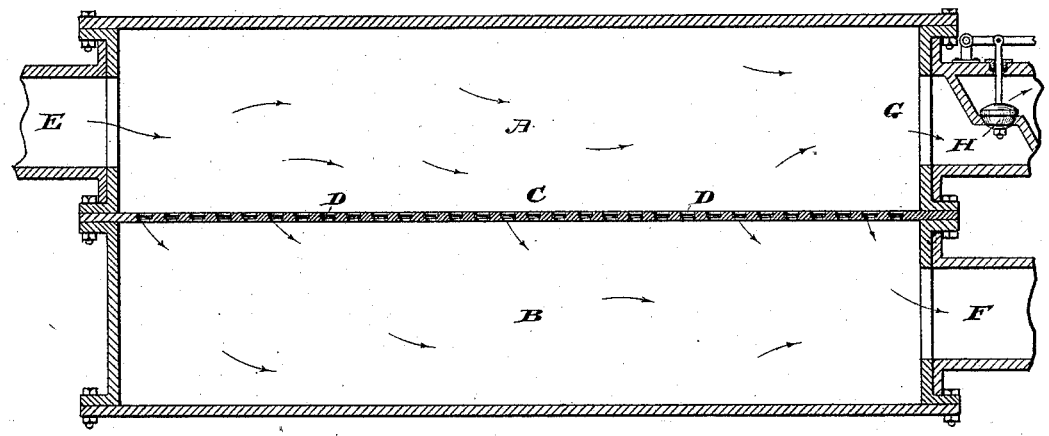
Figure 2:
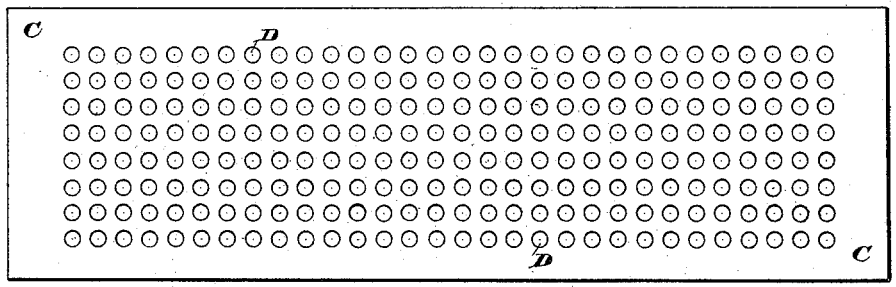
Figure 3:
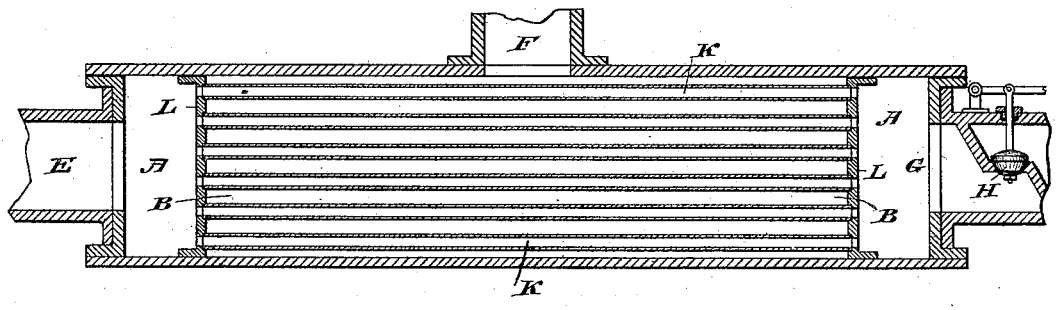
Figure 4:

The accompanying drawings represent apparatus constructed in accordance with the invention, Figure 1 being a central longitudinal vertical section of one form of apparatus; Fig. 2, a plan view of the diaphragm used therein; Fig. 3, a section, similar to Fig. 1, of another form of apparatus; and Fig. 4, an enlarged detail view.

Referring to Fig. 1, the apparatus or analyzer consists of two chambers, A B, separated by a diaphragm, C, which is perforated with numerous holes—say an inch (more or less) in diameter—and has thin disks D, of porous material, set in said holes. (See Fig. 4.) The material is preferably unglazed porcelain or biscuit-ware, although other suitable porous material may be used. One-sixteenth of an inch is a good thickness for the disks. They are, as shown, supported by internal flanges, and are or may be ground to their seats. Shellac or similar cementing material may be poured around the edges. To facilitate the grinding, an annular projection, d, is made on the bottom of the disks. They may be otherwise fixed in place.

The mixture of gases to be analyzed is introduced under pressure through the inlet E at one end of chamber A. The lighter gas, or rather the mixture, which passes through the porous material, and contains a larger proportion of the lighter gas or gases than the original mixture, passes from the chamber B by the outlet F. The heavier gas or remainder passes off by the outlet G, placed at the opposite end of the chamber A from the inlet E. The separated gases can by used for any suitable purpose. The mixture which passes through the diaphragm can be passed through as many analyzers as may be desired, in order still further to separate the light from the heavy gas.

In order to maintain the gas in the chamber A under pressure, a loaded valve, H, is placed in the outlet G. Other suitable means could be used to maintain the pressure. For example, a stop-cock, to be turned by hand, could be placed in the outlet G, and by closing this to a suitable extent, so as to form a contracted opening, the desired pressure can be obtained in the chamber A.

For separating hydrogen from water-gas a pressure of twenty inches of water in the chamber A, with a back-pressure of three inches, would be suitable; but the invention is not limited thereto, since the pressure may be increased or diminished. A partial vacuum could be maintained in the chamber B.

The generation of water-gas in the manufacture of hydrogen in accordance with the invention can be carried on in any suitable way—as, for example, by known methods and apparatus. The carbonic oxide which escapes by the outlet G, and the hydrogen containing a small proportion of carbonic oxide, which escapes by the outlet F, can be burned or utilized for any desired and suitable purpose.

The apparatus shown in Fig. 3 has a general resemblance to a tubular boiler or a tubular condenser. The porous material is in the form of a series of open-ended tubes, K, supported by and between heads L, and connecting the two end chambers, which, as they correspond to the chamber A of Fig. 1, are also lettered A. The gas or gases pass through the pores of the tubes into the central chamber, B, and then escape by the outlet F.

E is the inlet for the mixture to be analyzed, and G the outlet for the heavy gas, as in Fig. 1.

The tubes may be of unglazed porcelain, one inch external diameter, two feet long, and with walls one-eighth of an inch (more or less) thick.

I claim—

1. The method of manufacturing hydrogen by forming water-gas through decomposition of steam and separating the hydrogen therefrom by means of porous material, substantially as described.

2. The combination, with an apparatus for separating gases of different density, and comprising chambers communicating through porous material—such as unglazed porcelain—and provided with inlet and outlet, of a valve in the outlet of the chamber receiving the mixed gases, for maintaining the pressure therein, substantially as described.

In testimony whereof I have signed this specification in the presence of two subscribing witnesses.

HENRY H. EDGERTON.

Witnesses:
A. POLLOK,
PHILIP MAURO.